US010169556B2

(12) United States Patent
Lee et al.

(10) Patent No.: US 10,169,556 B2
(45) Date of Patent: Jan. 1, 2019

(54) VERIFYING A USER'S IDENTITY BASED ON ADAPTIVE IDENTITY ASSURANCE LEVELS

(71) Applicant: INTUIT INC., Mountain View, CA (US)

(72) Inventors: Robert E. Lee, Tempe, AZ (US); Thomas M. Pigoski, II, San Francisco, CA (US); Douglas L. Foiles, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 927 days.

(21) Appl. No.: 14/528,973

(22) Filed: Oct. 30, 2014

(65) Prior Publication Data

US 2016/0125199 A1    May 5, 2016

(51) Int. Cl.
*G06F 21/00* (2013.01)
*G06F 21/31* (2013.01)

(52) U.S. Cl.
CPC .... *G06F 21/316* (2013.01); *G06F 2221/2105* (2013.01)

(58) Field of Classification Search
CPC ........................ G06F 21/316; G06F 2221/2105
See application file for complete search history.

(56) References Cited

U.S. PATENT DOCUMENTS

| 8,239,677 | B2 | 8/2012 | Colson |
| 8,572,391 | B2 | 10/2013 | Golan et al. |
| 8,584,219 | B1 | 11/2013 | Toole et al. |
| 8,789,194 | B2 | 7/2014 | Toole et al. |
| 2007/0282610 | A1 | 12/2007 | Luss et al. |
| 2008/0127296 | A1* | 5/2008 | Carroll ................ G06F 21/33 726/1 |
| 2012/0072606 | A1* | 3/2012 | Shevchenko ...... H04L 12/2881 709/229 |
| 2012/0159590 | A1 | 6/2012 | Novack et al. |
| 2013/0191898 | A1 | 7/2013 | Kraft |
| 2014/0289116 | A1 | 9/2014 | Polivanyi |
| 2016/0212101 | A1* | 7/2016 | Reshadi ............. H04L 63/0414 |
| 2017/0093920 | A1* | 3/2017 | Ducatel ................. H04L 63/20 |

FOREIGN PATENT DOCUMENTS

WO      2014142947      9/2014

* cited by examiner

*Primary Examiner* — John B King
(74) *Attorney, Agent, or Firm* — Patterson + Sheridan, LLP

(57) ABSTRACT

The disclosed embodiments provide a system that manages access to a computer-based resource. During operation, the system obtains a request for the computer-based resource, wherein the request identifies a user seeking access to the computer-based resource. Next, the system obtains a set of security levels for a set of identity-proofing techniques, wherein the set of security levels is based on a first set of success rates of the identity-proofing techniques in preventing fraudulent access to computer-based resources. The system then calculates an identity assurance level for the user based on the set of security levels and a second set of success rates of the user in completing one or more of the identity-proofing techniques. Upon determining that the identity assurance level of the user meets a minimum identity assurance level for accessing the computer-based resource, the system enables access to the computer-based resource in a response to the request.

19 Claims, 4 Drawing Sheets

VERIFYING A USER'S IDENTITY BASED ON ADAPTIVE IDENTITY ASSURANCE LEVELS

BACKGROUND

RELATED ART

The disclosed embodiments relate to techniques for verifying a user's identity. More specifically, the disclosed embodiments relate to techniques for verifying a user's identity based on adaptive identity assurance levels.

Identity assurance techniques are commonly used to verify a user's identity to some degree of certainty. The degree of certainty is associated with different levels of assurance, wherein each level of assurance is established by undergoing one or more identity-proofing processes. For example, an identity assurance framework may define four levels of assurance. The first level may represent an unverified claim to an identity, such as a user providing a name without any evidence that the name belongs to the user. The second level may require basic identity proofing, such as the answering of a personal identity question. The third level may require a high level of identity proofing, such as remote or in-person presentation and verification of one or more identity credentials such as identification documents, financial documents, and/or other personally identifiable information (PII). Finally, the fourth level may require in-person presentation of multiple pieces of PII, along with verification of the PII using checks against databases, government records, and/or other sources of verification data.

However, levels of assurance may be defined differently across different domains and/or identity assurance frameworks. For example, providers of financial data and providers of healthcare data may require the use of different identity-proofing processes and/or services to verify user identities. In addition, the effectiveness of a given identity-proofing process may change over time, as attackers gain information and/or identify strategies that can be used to circumvent existing identity-proofing processes. In turn, a specific identity assurance framework that uses the identity-proofing process to achieve a certain level of assurance may be unable to maintain the level of assurance over time.

SUMMARY

Sensitive information is commonly protected by limiting access to authorized entities. For example, medical records for a person may only be released to the person or another person authorized to act on the person's behalf. As a result, the identity of an entity requesting sensitive information may require verification before the entity is granted access to the sensitive information. For example, a person may be required to answer a number of personal identity questions, provide photo identification, and/or provide other personally identifiable information (PII) before he/she is allowed to retrieve financial data or transfer money using his/her bank account. Each method of obtaining PII from the user provides a different identity-proofing technique for verifying the person's identity.

An identity-management system may use identity assurance levels to protect different types of sensitive information, wherein each identity assurance level represents a degree of certainty that a claim to a particular identity is true. In general, a higher identity assurance level may require more rigorous identity proofing than a lower identity assurance level. For example, a high identity assurance level may be required before an entity can access highly sensitive information such as classified government documents, while a low to moderate identity assurance level may only allow the entity to access less-sensitive information such as appointment information.

The identity assurance levels may also be adapted to the requirements of different data or service providers. For example, a financial institution may perform an online transfer for a user only after the user answers a number of personal identity questions, schedules the transfer, and confirms the transfer over email or Short Message Service (SMS). On the other hand, a different financial institution may allow the user to make online transfers without answering personal identity questions or confirming the transfer over a different communications mechanism. As a result, online transfers between different financial institutions may require different identity assurance levels for the different financial institutions based on differing sets of criteria.

Finally, the identity-management system may adjust the calculation of identity assurance levels based on the effectiveness of the identity-proofing techniques. For example, the amount that an identity-proofing technique contributes to an identity assurance level may be lowered in response to recent incidents of fraud with the identity-proofing technique.

The disclosed embodiments provide a system that manages access to a computer-based resource based on different identity assurance levels. During operation, the system obtains a request for the computer-based resource, wherein the request identifies a user seeking access to the computer-based resource. Next, the system obtains a set of security levels for a set of identity-proofing techniques, wherein the set of security levels is based on a first set of success rates of the identity-proofing techniques in preventing fraudulent access to computer-based resources. The system then calculates an identity assurance level for the user based on the set of security levels and a second set of success rates of the user in completing one or more of the identity-proofing techniques. Upon determining that the identity assurance level of the user meets a minimum identity assurance level for accessing the computer-based resource, the system enables access to the computer-based resource in a response to the request.

In some embodiments, upon determining that the identity assurance level of the user does not meet the minimum identity assurance level, the system also provides, in the response, one or more options for increasing the identity assurance level of the user to the minimum identity assurance level.

In some embodiments, providing the one or more options for increasing the identity assurance level of the user to the minimum identity assurance level includes initiating one or more of the identity-proofing techniques for increasing the identity assurance level of the user to the minimum identity assurance level.

In some embodiments, obtaining the set of security levels includes determining the first set of success rates from usage data for the identity-proofing techniques, and determining the set of security levels from the first set of success rates, wherein the set of security levels is determined based on a ranking of the first set of success rates of the identity-proofing techniques in preventing fraudulent access to the computer-based resources.

In some embodiments, the set of security levels is determined from the first set of success rates immediately before the identity assurance level is calculated for the user.

In some embodiments, the set of security levels is further determined based on a security policy for an external provider of the computer-based resource.

In some embodiments, the usage data includes a security incident and/or a fraud rate.

In some embodiments, calculating the identity assurance level for the user includes determining the second set of success rates from usage data comprising successful and failed attempts at completing the one or more of the identity-proofing techniques by the user, and calculating the identity assurance level for the user from the second set of success rates and the security levels.

In some embodiments, enabling access to the computer-based resource in the response includes obtaining the computer-based resource from an external provider, and providing the computer-based resource in the response.

In some embodiments, the set of identity-proofing techniques includes verification of contact information, remote verification of an identification document, verification of a relationship, verification of a biometric identifier, and/or verification of an authentication factor.

BRIEF DESCRIPTION OF THE FIGURES

In the figures, like reference numerals refer to the same figure elements.

DETAILED DESCRIPTION

Figure 1:
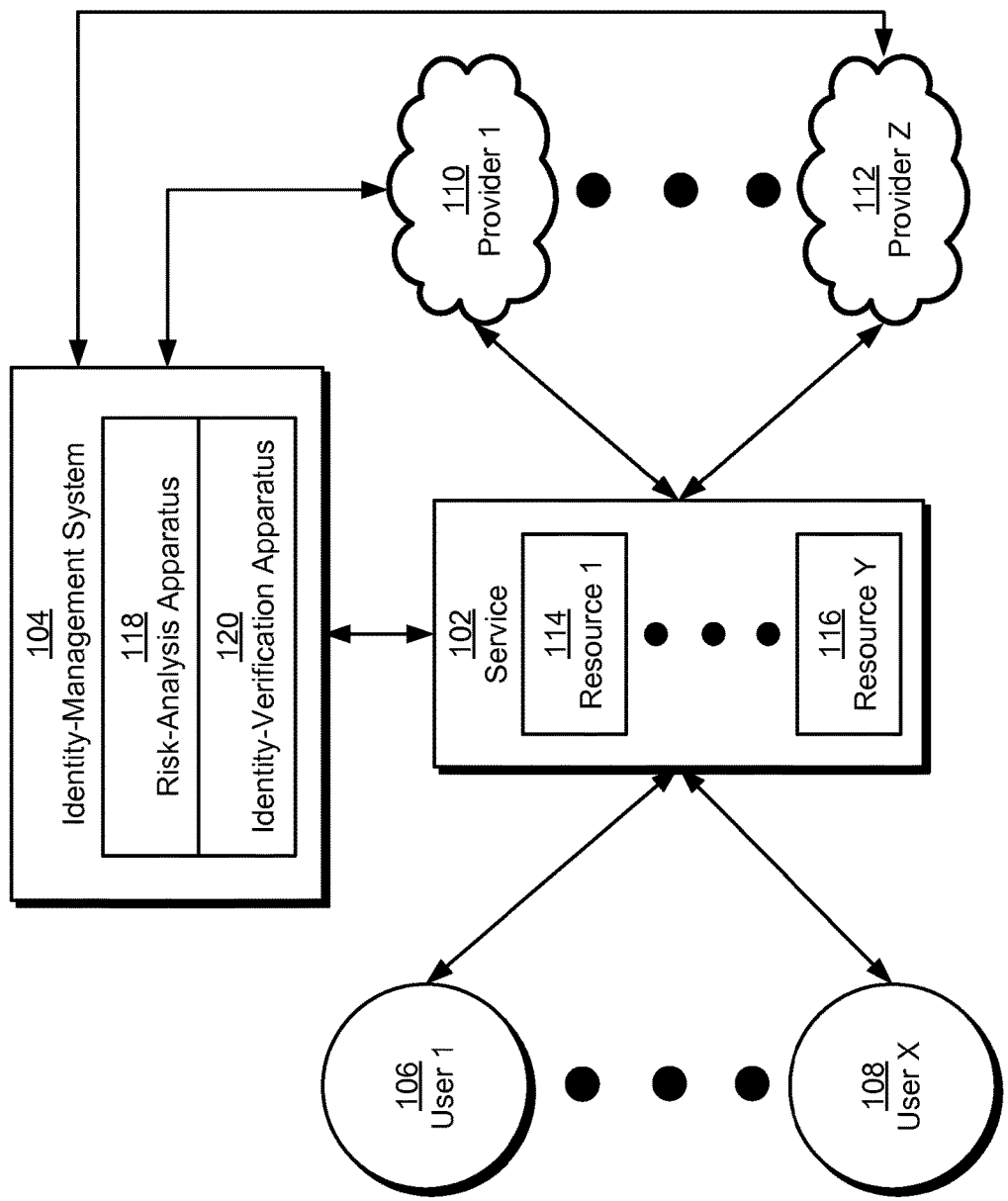
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Sensitive information is commonly protected by limiting access to authorized entities. For example, medical records for a person may only be released to the person or another person authorized to act on the person's behalf. As a result, the identity of an entity requesting sensitive information may require verification before the entity is granted access to the sensitive information. For example, a person may be required to answer a number of personal identity questions, provide photo identification, and/or provide other personally identifiable information (PII) before he/she is allowed to retrieve financial data and/or transfer money using his/her bank account. Each method of obtaining PII from the user includes a different identity-proofing technique for verifying the person's identity.

An identity-management system may use identity assurance levels to protect different types of sensitive information, wherein each identity assurance level represents a degree of certainty that a claim to a particular identity is true. For example, a higher identity assurance level may require more rigorous identity proofing than a lower identity assurance level. A high identity assurance level may be required before an entity can access highly sensitive information such as classified government documents, while a low to moderate identity assurance level may only allow the entity to access less-sensitive information such as appointment information.

The identity assurance levels may also be adapted to the requirements of different data or service providers. For example, a financial institution may perform an online transfer for a user only after the user answers a number of personal identity questions, schedules the transfer, and confirms the transfer over email or Short Message Service (SMS). On the other hand, a different financial institution may allow the user to make online transfers without answering personal identity questions or confirming the transfer over a different communications mechanism. As a result, online transfers with the financial institutions may be associated with different identity assurance levels, or the identity-management system may determine identity assurance levels for the financial institutions using different criteria.

Finally, the identity-management system may adjust the calculation of identity assurance levels based on the effectiveness of the identity-proofing techniques. For example, the amount that an identity-proofing technique contributes to an identity assurance level may be lowered in response to recent incidents of fraud with the identity-proofing technique.

The disclosed embodiments provide a method and system for managing access to computer-based resources, transactions or services. The computer-based resources may generally include applications, documents, and/or files. More specifically, the computer-based resources may include sensitive data such as government records, tax forms, medical records, education records, employment records, financial data, and/or other non-public information. Transactions may include, for example, financial transactions, purchases, reservations, contractual transactions, negotiations, and/or other exchanges of goods, services, value, and/or obligations. Examples of services may include bill payment services, appointment-scheduling services, data backup services, file-sharing services, and/or vehicle registration renewal services.

As shown in FIG. 1, a set of users (e.g., user 1 106, user x 108) may use a service 102 such as a native application, mobile application, web service, and/or other service or application from electronic devices such as personal computers, laptop computers, tablet computers, workstations, mobile phones, and/or portable media players, or other device capable of providing the service 102 to a user.

Service 102 may be distributed across one or more machines and accessed in various ways. For example, service 102 may be installed natively on a computer system and executed through an operating system on the computer system. Alternatively, service 102 may be implemented using a client-server architecture, in which service 102 executes on one or more servers and is accessed from other machines using a locally installed executable and/or a web browser and network connection. In other words, service 102 may be implemented using a cloud computing system that is accessed over the Internet, or other network.

Service 102 may provide a set of computer-based resources (e.g., resource 1 114, resource y 116), such as data and/or one or more features for accessing, storing, and/or manipulating the data, to the users. For example, service 102 may be an accounting application that allows the users to store financial data from bills, invoices, receipts, tax forms, statements, financial accounts, paychecks, and/or financial documents. The accounting application may also allow the users to perform tasks related to the financial data, such as generating payroll, tracking inventory, managing invoices, managing finances, making or servicing financial transactions, creating a budget, filing taxes, paying bills, tracking financial transactions, and/or generating reports.

Moreover, some or all of the resources used with service 102 may be obtained from external providers (e.g., provider 1 110, provider z 112). For example, service 102 may obtain financial data for the users from financial institutions, government records from government agencies, medical records from healthcare providers, employment records from employers, and/or education records from educational institutions. To access the resources, service 102 may communicate with the providers over one or more networks, such as local area networks (LANs), wide area networks (WANs), personal area networks (PANs), virtual private networks, intranets, cellular networks, Wi-Fi (Wi-Fi® is a registered trademark of Wi-Fi Alliance) networks, Bluetooth (Bluetooth® is a registered trademark of Bluetooth SIG, Inc.) networks, universal serial bus (USB) networks, and/or Ethernet networks. For example, service 102 may use web services and/or other network-based services to request and retrieve resources from the provider. In other words, service 102 may interface with the external providers to obtain resources for the users on the users' behalf.

Those skilled in the art will appreciate that resources provided by the providers may include sensitive data and/or important application functionality. For example, a financial institution may allow a user to access financial data related to the user's financial accounts and/or perform transactions such as bill payments and funds transfers. Misuse, release, and/or loss of the financial data and/or transactions may adversely impact the user's privacy or welfare.

To maintain the integrity, confidentiality, and/or availability of the resources, providers of the resources may restrict access to the resources to authorized users. For example, the providers may provide user accounts for the users and require authentication of the users before providing resources associated with the user accounts. A user may authenticate with a provider by providing a username and password for his/her user account to the provider. In turn, service 102 may retrieve the resources from the user accounts by obtaining authentication credentials for the user accounts from the users and authenticating with the providers as the users.

Those skilled in the art will also appreciate that the providers may require verification of the users' identities independently of authentication techniques that are linked to the users' accounts with the providers. For example, a financial institution may obtain a username and password for a user during the application process for opening an online banking account. The username and password may subsequently be used to verify that the user logging into the online banking account is the same as the user who created the online banking account. The financial institution may also require the user to undergo an identity-proofing process that establishes the user's identity by utilizing additional identity proofing methods, such as asking the user a series of dynamically generated personal identity questions, requiring the user to provide photo identification at a local branch, obtaining personally identifiable information (PII) from the user, obtaining a biometric identifier (e.g., fingerprint, retinal scan, etc.) from the user, obtaining a digital certificate from the user, and/or verifying contact information (e.g., phone number, email address) for the user. Consequently, the username and password may represent authentication factors that are used to access the online banking account, while additional identity proofing methods may be used to verify the user's identity before the online banking account is opened under the user's identity.

In another example, a government agency may release records for a user after the user has provided sufficient proof of his/her identity. In this example, the government agency may not require the user to create a user account that is identified by a username and password to obtain the government records.

In one or more embodiments, an identity-management system 104 is used by service 102 to provide centralized, adaptive identity verification and identity assurance for multiple providers (e.g., provider 1 110, provider z 112) of data, services, and/or other resources (e.g., resource 1 114, resource y 116). A risk-analysis apparatus 118 in identity-management system 104 may obtain and/or calculate a set of security levels for identity-proofing techniques that can be used to verify the users' identities. The security levels may reflect the effectiveness of the identity-proofing techniques in preventing fraudulent identity claims.

An identity-verification apparatus 120 in identity-management system 104 may calculate an identity assurance level for each user of service 102 based on the user's ability to complete one or more identity-proofing techniques. Identity-verification apparatus 120 may also compare the identity assurance level to a minimum identity assurance level for a given provider and/or resource to determine if the user is allowed to access the resource. If the identity assurance level meets the minimum, service 102 may obtain the resource from the provider and provide the resource to the user. If the identity assurance level does not meet the minimum, identity-verification apparatus 120 may provide one or more options to the user for increasing the identity assurance level to the minimum. The operation of identity-management system 104 is described in further detail below with respect to FIG. 2.

Figure 2:
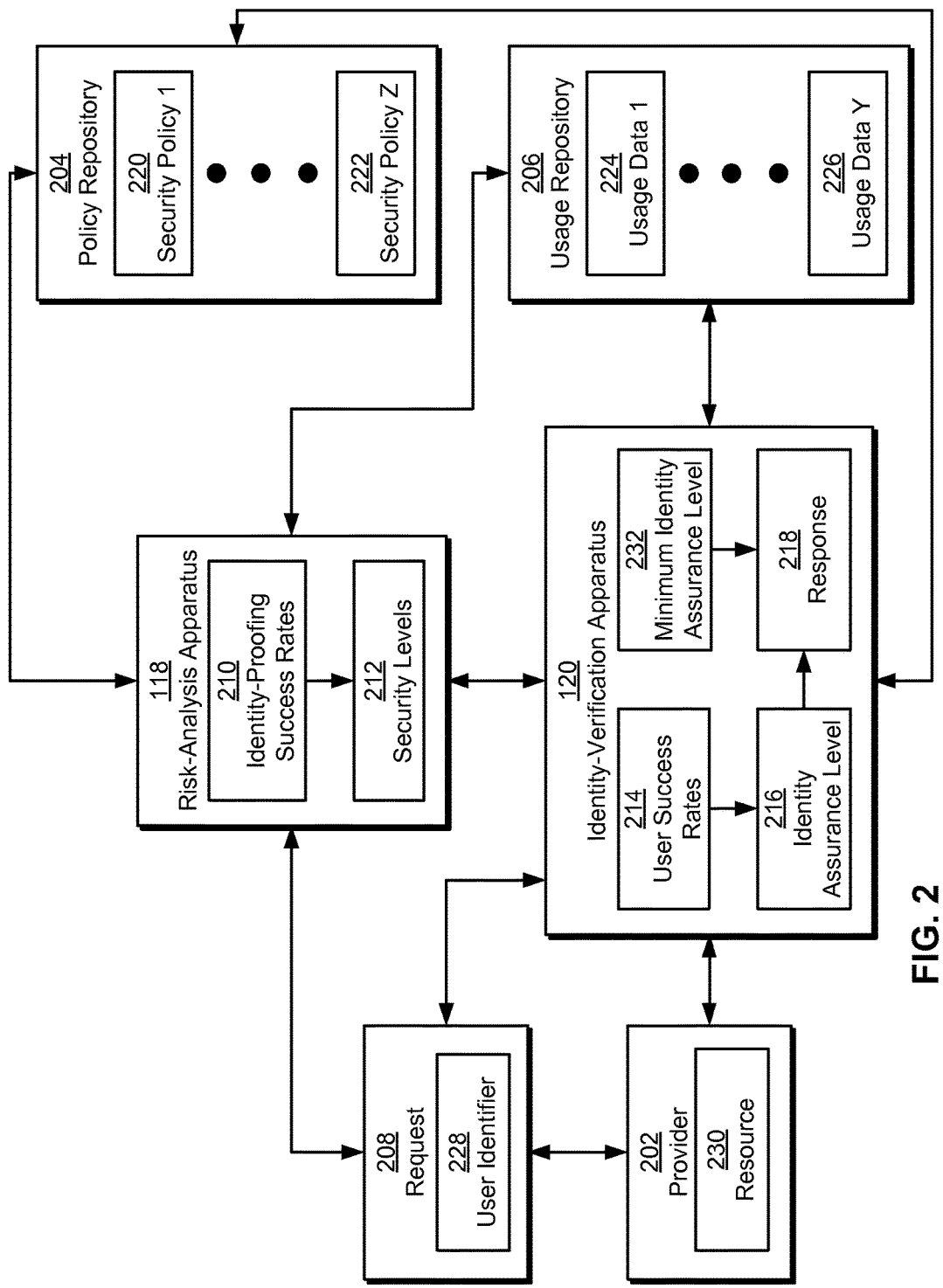
FIG. 2 shows an identity-management system in accordance with the disclosed embodiments.

FIG. 2 shows an identity-management system (e.g., identity-management system 104 of FIG. 1) in accordance with the disclosed embodiments. As mentioned above, the identity-management system may provide adaptive identity assurance for a number of providers of data, services, and/or other resources. As shown in FIG. 2 a provider 202 may provide a computer-based resource 230 such as an application, document, file, government record, tax form, medical record, education record, employment record, financial data, and/or other non-public information. To access resource 230, a request 208 may be made for resource 230. For example, request 208 may be made by a service (e.g., service 102 of FIG. 1) on behalf of a user, or request 208 may be made directly by the user.

Those skilled in the art will appreciate that resource 230 may not be limited to computerized data. For example, resource 230 may include a transaction that uses computerized data, such as a financial transaction, purchase, reservation, contractual transaction, negotiation, and/or other exchange of goods, services, information, money, and/or obligations. In another example, resource 230 may include a service related to the computerized data or transactions, such as a bill payment service, financial-management service, healthcare-management service, appointment-scheduling service, data backup service, file-sharing service, social networking service, teleconferencing service, and/or vehicle registration renewal service.

Request 208 may be received by provider 202 and forwarded to identity-verification apparatus 120, risk-analysis apparatus 118, and/or other components of the identity-management system prior to granting access to resource 230. Alternatively, the identity-management system may receive request 208 and/or other requests for resources from users and/or services before forwarding the requests to provider 202 and/or other providers. Regardless of the order in which request 208 is transmitted among provider 202 and components of the identity-management system, the identity-management system may verify the identity of the user before enabling access to resource 230.

After request 208 is received by the identity-management system, risk-analysis apparatus 118 and/or identity-verification apparatus 120 may identify the user from a user identifier 228 in request 208. For example, risk-analysis apparatus 118 and/or identity-verification apparatus 120 may obtain a username, full name, email address, numeric identifier (e.g., a primary and/or unique key), and/or other attribute that is provided as the user's identity claim. Risk-analysis apparatus 118 and identity-verification apparatus 120 may then match the identity claim to the user and process request 208 based on an identity assurance level 216 for the user.

In one or more embodiments, the identity-management system uses a set of identity-proofing techniques to perform adaptive identity assurance. Each identity-proofing technique may verify an aspect of the user's identity by using one or more mechanisms to obtain PII for the user. One identity-proofing technique may perform knowledge-based authentication, in which the user is asked a series of personal identity questions to verify knowledge of the user's personal information. Such personal identity questions may be generated from public records for the user and are separate from static challenge questions that are used to authenticate the user before the user is granted access to a user account. A second identity-proofing technique may obtain a user's contact information (e.g., phone number, postal address, etc.) from one or more public records and then validate that the user can be contacted by sending and/or receiving a verification message (e.g., one-time passcode via SMS, voice call, security postcard) using the contact information. A third identity-proofing technique may perform remote verification of an identification document by, for example, analyzing an image (e.g., from a webcam and/or mobile device camera) of the user holding photo identification and matching the information and picture in the photo identification with government records and/or the user's face. In another example, remote verification of an identification document (e.g., a military identification card) may be performed using specialized hardware that reads the identification document when the identification document is inserted.

A fourth identity-proofing technique may verify a relationship between the user and another entity to provide an extension of trust between the user and the other entity. For example, the identity-proofing technique may verify a relationship between the user and an employer by obtaining a tax form for the user from the employer and asking the user to provide the value of a box in the user's tax form. In turn, the extension of trust between the user and employer may allow the user to obtain documents (e.g., tax forms, pay stubs, employment agreements, etc.) related to the user's employment with the employer. While a number of identity-proofing techniques have been described above, those skilled in the art will appreciate that other identity-proofing techniques may be used by the system of FIG. 2 to provide identity assurance.

As shown in FIG. 2, the identity-management system may also include a policy repository 204 and a usage repository 206. The contents of policy repository 204 and usage repository 206 may be used to dynamically adjust the identity-assurance requirements for resources such as resource 230, as described below.

Policy repository 204 may include a set of security policies (e.g., security policy 1 220, security policy z 222) for providers (e.g., provider 202) of resources that obtain identity assurance from the identity-management system. The security policies may define identity-verification requirements for accessing various resources, such as specific identity-proofing techniques that must be used, can be used, and/or cannot be used to verify a user's identity. The security policies may further associate certain resources and/or identity-proofing requirements with certain identity assurance levels, in lieu of or in addition to required, allowed, and/or prohibited identity-proofing techniques. Security policies in policy repository 204 may be configured and/or updated dynamically to reflect the identity-verification requirements of the providers and/or nature of the resources provided by the providers.

Usage repository 206 may include usage data (e.g., usage data 1 224, usage data y 226) for the identity-proofing techniques. The usage data may represent successful, unsuccessful, and/or fraudulent use of the identity-proofing techniques. For example, the usage data may include successful verification attempts by users, failed verification attempts by users, security incidents, and/or fraud rates for the identity-proofing techniques. The usage data may be obtained from one or more sources and aggregated into usage repository 206. For example, the usage data may be provided by the identity-management system (e.g., during use of the identity-proofing techniques), another identity-proofing provider, and/or an external report or audit of identity-proofing performance. As a result, usage data in usage repository 206 may contain an up-to-date representation of the use of identity-proofing techniques by the users, as well as the effectiveness of the identity-proofing techniques at preventing fraud.

To perform adaptive identity assurance using the identity-proofing techniques, risk-analysis apparatus 118 may determine a set of security levels 212 for the identity-proofing techniques. Each security level may represent the "contribution" of the corresponding identity-proofing technique to identity assurance level 216. For example, the security level may denote an amount by which identity assurance level 216 may be increased by successfully completing the identity-proofing technique. Conversely, the security level may indicate that the identity-proofing technique can only be used to achieve a certain maximum identity assurance level, even if the identity-proofing technique is combined with other identity-proofing techniques.

Security levels 212 may be determined by risk-analysis apparatus 118 on demand (e.g., every time a request for a resource is received) and/or periodically (e.g., hourly, daily, etc.). Security levels 212 may additionally be based on a set of identity-proofing success rates 210, which are calculated by risk-analysis apparatus 118 from usage data in usage repository 206. For example, risk-analysis apparatus 118 may calculate identity-proofing success rates 210 from the number of security incidents and/or a fraud rate for each identity-proofing technique that can be used in determining identity assurance level 216. Consequently, identity-proofing success rates 210 may represent the effectiveness of the identity-proofing techniques in preventing fraud.

Once identity-proofing success rates 210 are determined, risk-analysis apparatus 118 may determine security levels 212 from identity-proofing success rates 210 and/or a security policy for provider 202 from policy repository 204. Risk-analysis apparatus 118 may first rank the identity-proofing techniques by identity-proofing success rates 210. For example, risk-analysis apparatus 118 may rank the identity-proofing techniques in descending order of success rate so that the most successful (e.g., effective) identity-proofing techniques are at the top of the ranking.

Next, risk-analysis apparatus 118 may assign a security level to each identity-proofing technique based on the ranking and/or information in the security policy. For example, risk-analysis apparatus 118 may assign security levels to the identity-proofing techniques based on the strength of the identity-proofing technique and the success rate of the identity-proofing technique. A very strong and/or effective identity proofing technique (e.g., military ID verification using specialized hardware plus a passcode) may be given a high security level, while a weaker and/or less effective identity proofing technique (e.g., knowledge-based authentication) may be given a lower security level. Risk-analysis apparatus 118 may also adjust the security level based on the security policy; an identity-proofing technique that is banned by the security policy may be given a security level of 0, while an identity-proofing technique that satisfies an identity-verification requirement of the security policy for accessing resource 230 may be given a high security level.

Identity-verification apparatus 120 may then use security levels 212 and a set of user success rates 214 to calculate identity assurance level 216. Like identity-proofing success rates 210, user success rates 214 may be determined and/or calculated from usage data in usage repository 206. For example, a user success rate for an identity-proofing technique may be calculated from the numbers and/or frequencies of successful and failed attempts at completing the identity-proofing technique by the user. The user success rates may then be combined with security levels 212 to obtain an overall identity assurance level 216 for the user. For example, user success rates 214 may be used to generate weights in a linear combination of security levels 212 for calculating identity assurance level 216. An identity-proofing technique with a high failure rate may be given a weight of 0, while an identity-proofing technique that has been successfully completed with little to no failed attempts may be given a weight of 1 or close to 1.

As with security levels 212, calculation of identity assurance level 216 may be affected by the security policy for provider 202. For example, identity-verification apparatus 120 may adjust the weights used to combine security levels 212 into identity assurance level 216 based on the security policy. If the security policy penalizes failed attempts at completing an identity-proofing technique, identity-verification apparatus 120 may reduce the weight for the identity-proofing technique for any failed attempts at the identity-proofing technique, even if the user has successful completion attempts for the same identity-proofing technique.

Identity-verification apparatus 120 may also use other operations and/or calculations to generate identity assurance level 216 based on user success rates 214, security levels 212, and/or the security policy. For example, if the security policy specifies that any or all of a set of identity-proofing techniques may be used to achieve a given identity assurance level (e.g., identity assurance level 216), identity-verification apparatus 120 may use a logical disjunction to combine security levels 212 and user success rates 214 of the specified identity-proofing techniques into a true or false value for the identity assurance level. Conversely, if the security policy specifies that one or more identity-proofing techniques are required to achieve a given identity assurance level, identity-verification apparatus 120 may use a logical conjunction to combine security levels 212 and user success rates 214 of the specified identity-proofing techniques into the true or false value. In another example, identity-verification apparatus 120 may use nonlinear functions to combine security levels 212 and/or user success rates 214 into identity assurance level 216.

After identity assurance level 216 is calculated, identity-verification apparatus 120 may compare identity assurance level 216 with a minimum identity assurance level 232 for resource 230. Minimum identity assurance level 232 may be obtained from the security policy for provider 202 and/or as a default minimum identity assurance level 232 for provider 202 and/or the resource type of resource 230. Identity-verification apparatus 120 may then generate a response 218 based on the comparison. If identity assurance level 216 meets minimum identity assurance level 232, identity-verification apparatus 120 may enable access to resource 230 in response 218. For example, identity-verification apparatus 120 may include a confirmation that identity assurance level 216 meets minimum identity assurance level 232 in response 218 to provider 202, and provider 202 may provide resource 230 to the user and/or service from which request 208 was received. Alternatively, identity-verification apparatus 120 may use identity assurance level 216 to retrieve resource 230 from provider 202 and provide resource 230 in response 218, which is transmitted to the user and/or service from which request 208 was received.

If identity assurance level 216 does not meet minimum identity assurance level 232, identity-verification apparatus 120 may provide one or more options for increasing identity assurance level 216 to minimum identity assurance level 232 in response 218. For example, identity-verification apparatus 120 may use the security policy to identify one or more identity-proofing techniques that may be used to increase identity assurance level 216 to minimum identity assurance level 232. Identity-verification apparatus 120 may then initiate the identity-proofing technique(s) in response 218 and/or provide the identity-proofing technique(s) as options for the user in response 218. Successful and/or failed attempts at completing the identity-proofing technique(s) by the user may also be tracked and added to usage repository 206 for subsequent calculations of identity assurance level 216 for the user.

By calculating and enforcing identity assurance levels (e.g., identity assurance level 216) on a per-request basis (e.g., request 208), the identity-management system may tailor the processing of requests for resources (e.g., resource 230) to the importance and/or sensitivity of the resources. As a result, the user may be required to complete an identity-proofing technique only when the user requests a resource with an identity assurance level that requires the identity-proofing technique. Moreover, the adjusting of identity assurance levels based on security policies and success rates (e.g., identity-proofing success rates 210, user success rates 214) may allow the identity-management system to adapt to changes in the security landscape on a "just in time" basis, as the security landscape, policies and success rates change over time (minute, day, week, month, etc.), and maintain the appropriate degrees of assurance associated with the identity assurance levels at the time of the request.

Those skilled in the art will appreciate that the system of FIG. 2 may be implemented in a variety of ways. More specifically, risk-analysis apparatus 118, identity-verification apparatus 120, policy repository 204, and usage repository 206 may be provided by a single physical machine, multiple computer systems, one or more virtual machines, a grid, one or more databases, one or more file systems, and/or a cloud computing system. Risk-analysis apparatus 118 and identity-verification apparatus 120 may additionally be implemented together and/or separately by one or more hardware and/or software components and/or layers.

Those skilled in the art will further appreciate that the identity-management system of FIG. 2 may generally be used to perform adaptive user authentication and/or identity management. For example, risk-analysis apparatus 118 may assess the success rates of various authentication techniques at preventing fraud and assign appropriate security levels (e.g., security levels 212) to the authentication techniques based on the success rates and/or security policies for providers of computerized resources, transactions, and/or services. The authentication techniques may include, but are not limited to, usernames and passwords, biometric identifiers, security tokens, signatures, personal identification numbers (PINs), and/or pattern factors. The authentication techniques may additionally employ multi-factor authentication that requires the use of two or more authentication factors to authenticate a user. For example, multi-factor authentication of a user may require the use of a username and password, along with verification of contact information (e.g., phone number, email address, mailing address, etc.) for the user, before the user is authenticated.

Identity-verification apparatus 120 may use the security levels and user success rates (e.g., user success rates 214) at completing the authentication techniques to calculate an authentication assurance level for a user and process a request (e.g., 208) to access or use a resource (e.g., resource 230) by the user based on the authentication assurance level. If the user's authentication assurance level does not meet a minimum authentication assurance level for accessing or using the resource, the user may be required to successfully complete one or more additional authentication techniques before the user is granted access to or use of the resource.

The identity-management system may additionally combine security levels for identity-proofing techniques and authentication techniques into an overall assurance level for the user. The overall assurance level may then be used to manage access to a variety of resources by the user and/or on the user's behalf, including user accounts of the user, records associated with the user's identity, information the user is cleared to access, transactions in which the user is involved, and/or services that are available to the user.

Figure 3:
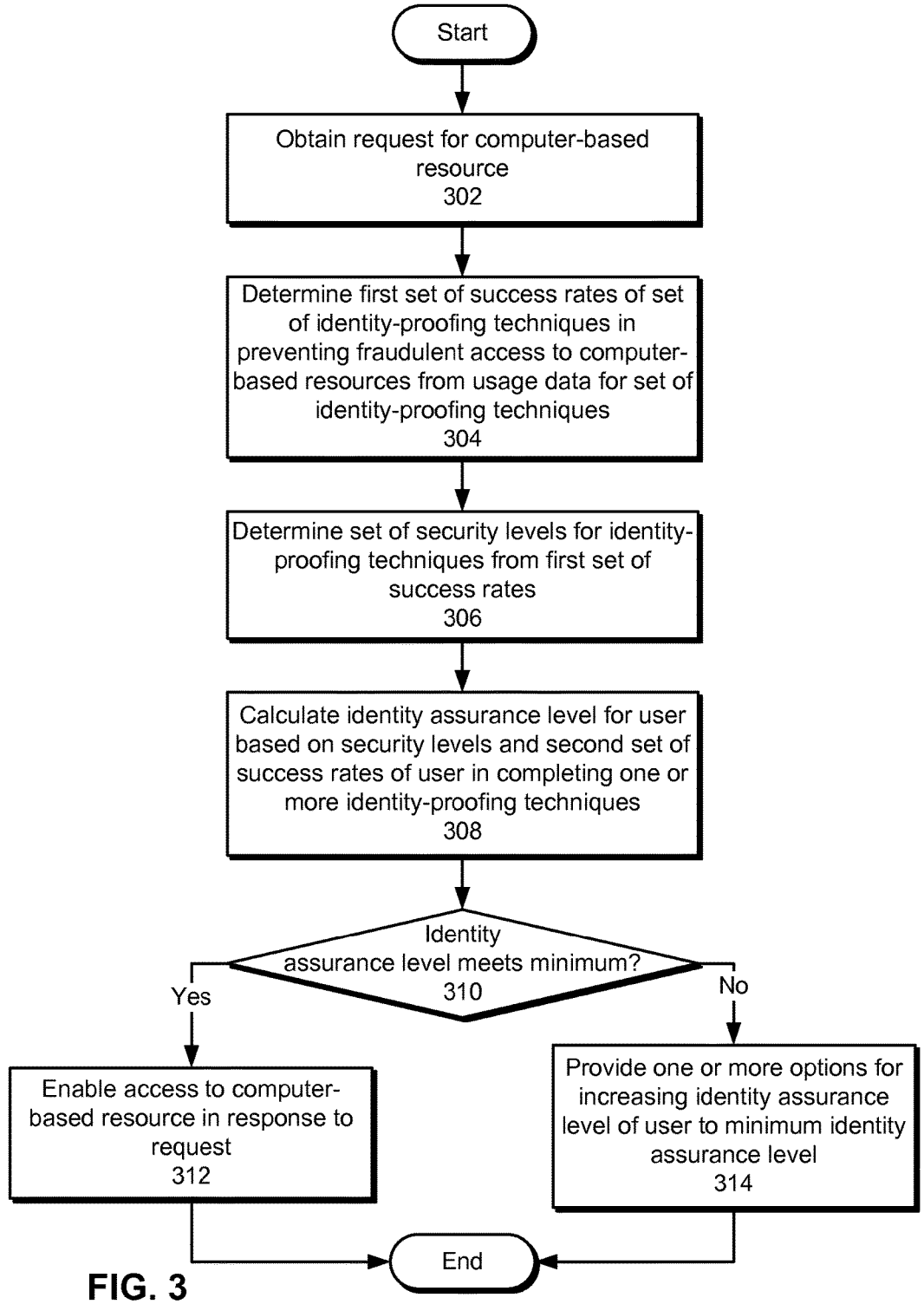
FIG. 3 shows a flowchart illustrating the process of managing access to a computer-based resource in accordance with the disclosed embodiments.

FIG. 3 shows a flowchart illustrating the process of managing access to a computer-based resource in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a request for a computer-based resource is obtained (operation 302). The computer-based resource may include an application, document, file, government record, tax form, medical record, education record, employment record, financial data, and/or non-public information. The computer-based resource may also include a transaction and/or service that is implemented or provided by one or more computer systems. The request may be made by a user and/or service acting on behalf of the user.

Next, a set of security levels for a set of identity-proofing techniques is obtained and/or calculated. The identity-proofing techniques may include verification of contact information, remote verification of an identification document, verification of a relationship, verification of a biometric identifier, and/or verification of an authentication factor.

To calculate the security levels, a first set of success rates (e.g., identity-proofing success rates 210 of FIG. 2) of the identity-proofing techniques in preventing fraudulent access to computer-based resources is determined from usage data for the identity-proofing techniques (operation 304). The usage data may include security incidents and/or fraud rates associated with the identity-proofing techniques. The security levels may then be determined from the first set of success rates (operation 306). For example, the security levels may be adjusted up or down according to a ranking of the success rates. The security levels may also be determined based on a security policy for an external provider of the computer-based resource. For example, the security levels may be increased, decreased, or set to 0 based on the identity-verification requirements of an external provider of the resource.

An identity assurance level for the user is then calculated based on the security levels and a second set of success rates (e.g., user success rates 214 of FIG. 2) of the user in completing one or more of the identity-proofing techniques (operation 308). During calculation of the identity assurance level, the second set of success rates is determined from usage data containing successful and failed attempts at completing the one or more of the identity-proofing techniques by the user. The identity assurance level is then calculated from the second set of success rates and the security levels. For example, the second set of success rates may be combined with the security levels according to a formula from the security policy to produce a numeric value representing the identity assurance level. In addition, the identity assurance level and security levels may be calculated on a "just in time" basis to reflect the latest success rates in preventing fraudulent access to computer-based resources and/or verifying user identities. For example, the security levels may be recalculated from up-to-date success rates of the identity-proofing techniques in preventing fraud whenever a request for a computerized resource is received. The newly calculated security levels may then be used to calculate an identity assurance level that reflects the security landscape at the time at which the request was made.

The request may be processed based on the meeting of a minimum identity assurance level by the identity assurance level (operation 310). The minimum identity assurance level may be specific to the resource and/or provider of the resource. For example, the identity assurance level may be based on the user's successful completion of an identity-proofing technique, which verifies the user's relationship with his/her employer by obtaining tax form information, paycheck information, and/or other employment-based information from the user. The identity assurance level may thus meet the minimum identity assurance level for accessing all data related to the user's employment with the employer. On the other hand, if the user attempts to access data from another employer, the identity assurance level may not meet the minimum identity assurance level for the other employer unless the user successfully completes additional identity-proofing techniques.

If the identity assurance level meets the minimum identity assurance level, access to the computer-based resource is enabled in a response to the request (operation 312). For example, the computer-based resource may be obtained from the external provider and provided in the response. Alternatively, confirmation that the user meets the minimum identity assurance level may be provided in the response to the provider, and the provider may enable access to the computer-based resource by the user (e.g., by providing the resource or a token representing the resource to the user).

If the identity assurance level does not meet the minimum, one or more options for increasing the identity assurance level to the minimum are provided (operation 314). For example, one or more identity-proofing techniques for increasing the identity assurance level to the minimum identity assurance level may be initiated using the response.

Figure 4:
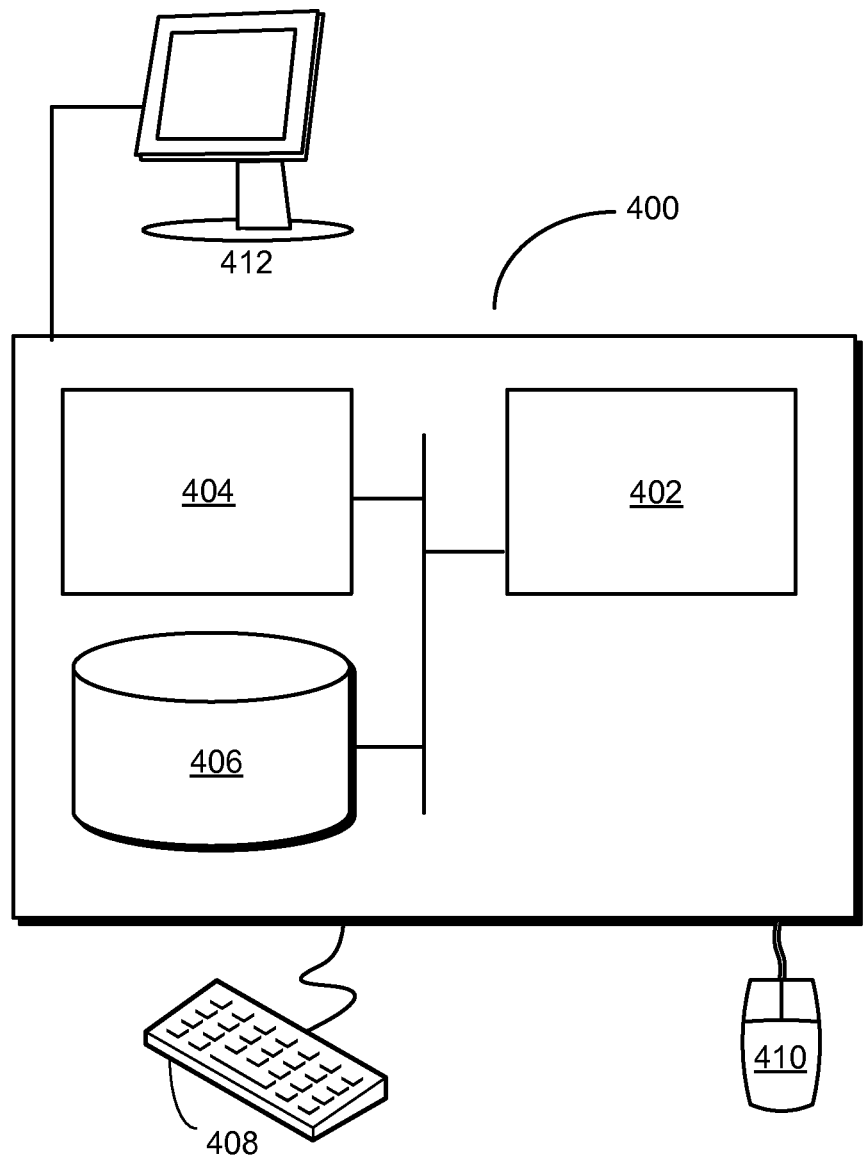
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for managing access to a computer-based resource. The system may include a risk-analysis apparatus that obtains and/or calculates a set of security levels for a set of identity-proofing techniques based on a first set of success rates of the identity-proofing techniques in preventing fraudulent access to computer-based resources. The system may also include an identity-verification apparatus that obtains a request for the computer-based resource. The request may identify a user seeking access to the computer-based resource. Next, the identity-verification apparatus may calculate an identity assurance level for the user based on the set of security levels and a second set of success rates of the user in completing one or more of the identity-proofing techniques. Upon determining that the identity assurance level of the user meets a minimum identity assurance level for accessing the computer-based resource, the identity-verification apparatus may enable access to the computer-based resource in a response to the request.

In addition, one or more components of computer system 400 may be remotely located and connected to the other components over a network. Portions of the present embodiments (e.g., risk-analysis apparatus, identity-verification apparatus, etc.) may also be located on different nodes of a distributed system that implements the embodiments. For example, the present embodiments may be implemented using a cloud computing system that provides adaptive identity assurance for a set of remote users, providers, and/or resources.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing access to a computer-based resource, comprising:
   receiving a request from a user for a computer-based resource, wherein the computer-based resource is associated with a minimum identity assurance level;
   determining an identity assurance level of the user by;
      calculating an identity-proofing success rate based on usage data in a usage repository for each of a plurality of identity-proofing techniques;
      determining a security level for each respective identity-proofing technique of the plurality of identity-proofing techniques based on the respective identity-proofing success rate associated with the respective identify-proofing technique,
      calculating a user success rate based on the usage data in the usage repository for each of a plurality of identity-proofing techniques; and
      calculating the identity assurance level of the user based on the user success rate and the security level of each of the plurality of the identify-proofing techniques; and
   determining the identity assurance level of the user meets the minimum identity assurance level associated with the computer-based resource; and
   enabling access to the computer-based resource in a response to the request.

2. The method of claim 1, wherein the method further comprises:
   determining the identity assurance level of the user does not meet the minimum identity assurance level associated with the computer-based resource; and
   providing, in the response, one or more options for increasing the identity assurance level of the user.

3. The method of claim 2, wherein providing the one or more options for increasing the identity assurance level of the user comprises: initiating one or more of the identity-proofing techniques.

4. The method of claim 1, wherein the determining the security level for each respective identity-proofing technique of the plurality of identity-proofing techniques further comprises at least one of:
  ranking each identity-proofing technique based on the respective identity-proofing success rate; or
  adjusting the security level based on a security policy.

5. The method of claim 1, wherein the usage data for calculating the identity-proofing success rate comprises at least one of:
  a security incident rate for the identity-proofing technique; or
  a fraud rate for the identity-proofing technique.

6. The method of claim 1, wherein enabling access to the computer-based resource in the response comprises:
  retrieving the computer-based resource from a provider of the computer-based resource; and
  providing the computer-based resource to the user in the response.

7. The method of claim 1, wherein each identity-proofing technique verifies at least one aspect of the user identity.

8. An apparatus comprising:
  one or more processors; and
  a memory storing instructions that, when executed by the one or more processors, cause the apparatus to:
    receive a request from a user a computer-based resource, wherein the computer-based resource is associated with a minimum identity assurance level;
    determine an identity assurance level of the user by;
      calculating an identity-proofing success rate based on usage data in a usage repository for each of a plurality of identity-proofing techniques;
      determining a security level for each respective identity-proofing technique of the plurality of identity-proofing techniques based on the respective identity-proofing success rate associated with the respective identify-proofing technique;
      calculating a user success rate based on the usage data in the usage repository for each of the plurality of identity-proofing techniques; and
      calculating the identity assurance level of the user based on the user success rate and the security level of each of the plurality of identify-proofing techniques; and
    determine the identity assurance level of the user meets the minimum identity assurance level associated with the computer-based resource; and
    enable access to the computer-based resource in a response to the request.

9. The apparatus of claim 8, wherein the memory further stores instructions that, when executed by the one or more processors, cause the apparatus to:
  determine the identity assurance level of the user does not meet the minimum identity assurance level associated with the computer-based resource; and
  provide, in the response, one or more options for increasing the identity assurance level of the user.

10. The apparatus of claim 8, wherein determining the security level for each respective identity-proofing technique of the plurality of identity-proofing techniques further comprises at least one of:
  ranking each identity-proofing technique based on the respective identity-proofing success rate; or
  adjusting the security level based on a security policy.

11. The apparatus of claim 8, wherein the usage data for calculating the identity-proofing success rate comprises at least one of:
  a security incident rate for the identity-proofing technique; or
  a fraud rate for the identity-proofing technique.

12. The apparatus of claim 8, wherein each identity-proofing technique verifies at least one aspect of the user's identity.

13. A non-transitory computer-readable storage medium storing instructions that when executed by a computer cause the computer to perform a method for managing access to a computer-based resource, the method comprising:
  receiving a request from a user for a computer-based resource, wherein the computer-based resource is associated with a minimum identity assurance level;
  determining an identity assurance level of the user by;
    calculating an identity-proofing success rate based on usage data in a usage repository for each of a plurality of identity-proofing techniques;
    determining a security level for each respective identity-proofing technique of the plurality of identity-proofing techniques based on the respective identity-proofing success rate associated with the respective identify-proofing technique;
    calculating a user success rate based on the usage data in the usage repository for each of the plurality of identity-proofing techniques; and
    calculating the identity assurance level of the user based on the user success rate and the security level of each of the plurality of identify-proofing techniques; and
  determining the identity assurance level of the user meets the minimum identity assurance level associated with the computer-based resource; and
  enabling access to the computer-based resource in a response to the request.

14. The non-transitory computer-readable storage medium of claim 13, wherein the method further comprises:
  determining the identity assurance level of the user does not meet the minimum identity assurance level associated with the computer-based resource: and
  providing, in the response, one or more options for increasing the identity assurance level of the user.

15. The method of claim 3, wherein initiating the one or more identity proofing techniques is based on a security policy.

16. The method of claim 1, wherein the usage data for calculating the user success rate comprises at least one of:
  a number of successful attempts by the user at completing the identity-proofing technique;
  a frequency of the successful attempts by the user at completing the identity-proofing technique;
  a number of failed attempts by the user at completing the identity-proofing technique; or
  a frequency of the failed attempts by the user at completing the identity-proofing technique.

17. The apparatus of claim 8, wherein the usage data for calculating the user success rate comprises at least one of:
  a number of successful attempts by the user at completing the identity-proofing technique;
  a frequency of the successful attempts by the user at completing the identity-proofing technique;
  a number of failed attempts by the user at completing the identity-proofing technique; or
  a frequency of the failed attempts by the user at completing the identity-proofing technique.

18. The non-transitory computer-readable storage medium of claim 13, wherein the determining the security level for each respective identity-proofing technique of the plurality of identity-proofing techniques further comprises at least one of:
- ranking each identity-proofing technique based on the respective identity-proofing success rate; or
- adjusting the security level based on a security policy.

19. The non-transitory computer-readable storage medium of claim 13, wherein the usage data for calculating the user success rate comprises at least one of:
- a number of successful attempts by the user at completing the identity-proofing technique;
- a frequency of the successful attempts by the user at completing the identity-proofing technique;
- a number of failed attempts by the user at completing the identity-proofing technique; or
- a frequency of the failed attempts by the user at completing the identity-proofing technique.

\* \* \* \* \*